United States Patent [19]

Szydlo et al.

[11] Patent Number: 4,810,637
[45] Date of Patent: Mar. 7, 1989

[54] NON-LINEAR CONTROL ELEMENT FOR A FLAT ELECTROOPTICAL DISPLAY SCREEN AND A METHOD OF FABRICATION OF SAID CONTROL ELEMENT

[75] Inventors: Nicolas Szydlo, Limours; Jean N. Perbet; Rolande Kasprzak, both of Gif sur Yvette, all of France

[73] Assignee: Thomson-Csf, Paris, France

[21] Appl. No.: 149,976

[22] Filed: Jan. 27, 1988

Related U.S. Application Data

[63] Continuation of Ser. No. 859,837, May 5, 1986, abandoned.

[30] Foreign Application Priority Data

May 7, 1985 [FR] France .................. 85 06964

[51] Int. Cl.$^4$ .................. H01L 27/06; G09G 3/36
[52] U.S. Cl. .................. 437/15; 437/101;
437/175; 437/189; 437/193; 437/228; 437/233;
437/966; 148/DIG. 139; 148/DIG. 1; 156/653;
156/657; 357/2
[58] Field of Search ............... 437/101, 15, 175, 177,
437/180, 189, 191, 192, 193, 225, 228, 233, 245;
148/DIG. 139, DIG. 140; 357/2; 156/653, 657

[56] References Cited

U.S. PATENT DOCUMENTS

| 3,626,328 | 12/1971 | Esaki et al. ................. 357/58 |
| 3,748,501 | 7/1973 | Fritzche et al. ................. 357/2 |
| 3,882,533 | 5/1975 | Dähler ................. 357/58 |
| 4,095,011 | 6/1978 | Hawrylo et al. ................. 357/2 |
| 4,158,717 | 6/1979 | Nelson ................. 136/255 |
| 4,400,409 | 8/1983 | Izu et al. ................. 29/572 |
| 4,525,593 | 6/1985 | Yablonovitch ................. 428/446 |
| 4,535,327 | 8/1985 | Hareng et al. ................. 357/45 |
| 4,567,499 | 6/1986 | Hockley et al. ................. 357/59 B |
| 4,583,087 | 4/1986 | van de Venne ................. 340/719 |
| 4,600,935 | 7/1986 | Dresner ................. 357/2 |
| 4,601,097 | 7/1986 | Shimbe ................. 29/572 |
| 4,728,997 | 3/1988 | Szydlo et al. ................. 437/228 |

FOREIGN PATENT DOCUMENTS

| 0070598 | 1/1983 | European Pat. Off. . |
| 0073705 | 9/1983 | European Pat. Off. . |
| 2518788 | 6/1983 | France . |
| 2548450 | 1/1985 | France . |
| 0211787 | 12/1982 | Japan ................. 357/2 |
| 0177322 | 9/1985 | Japan ................. 357/2 |
| 2146827 | 6/1985 | United Kingdom . |

OTHER PUBLICATIONS

Applied Physics Letters, vol. 44, No. 2, Jan. 1984, pp. 205–206, American Institute of Physics, New York; N. Szydlo et al.: "New Amorphous Silicon Nonlinear Element for Liquid Crystal Display Addressing".

Primary Examiner—Brian E. Hearn
Assistant Examiner—Kevin McAndrews
Attorney, Agent, or Firm—Oblon, Fisher, Spivak, McClelland & Maier

[57] ABSTRACT

A method of fabrication of non-linear control elements as applicable to electrooptical displays and in particular to large-area liquid-crystal displays of the flat-panel type, in which the following layers are stacked successively on a substrate: a first layer of metallic material, a first layer of undoped amorphous semiconductor material, a layer of doped amorphous semiconductor material, a second layer of undoped amorphous semiconductor material, and a second layer of metallic material.

7 Claims, 6 Drawing Sheets

NON-LINEAR CONTROL ELEMENT FOR A FLAT ELECTROOPTICAL DISPLAY SCREEN AND A METHOD OF FABRICATION OF SAID CONTROL ELEMENT

This application is a continuation of application Ser. No. 859,837, filed on May 5, 1986, now abandoned.

BACKGROUND OF THE INVENTION

1. Field of the Invention

This invention relates to a non-linear control element for a flat electrooptical display screen, especially for a liquid-crystal display screen, and also to a method o fabrication of said control element.

The present invention finds an application in the general field of large-area thin-film electronics and is more specifically applicable to integrated control of each elementary point of a liquid-crystal screen.

2. Description of the Prior Art

It is already known that liquid-crystal display screens usually have a large number of image points or elements of square or rectangular shape. These image elements can be addressed individually. The definition of the screen is a function of the number of points which are capable of receiving an item of information. Control of each point is performed by application of an electric field. For the purpose of visualizing video information, it has been proposed to provide matrix-type displays in which each image element is defined by the intersection of two orthogonal arrays of leads designated as rows and columns.

Addressing of an image element by means of control voltages applied to the row and to the column which relate to said element does not need to be maintained in the event of adoption of a time-multiplexing technique which permits refreshment of the state of the screen by recurrence. This technique is based on a persistence effect which may be either physiological or available within the screen element. In the case of liquid-crystal display devices, an image element can be assimilated with a capacitor in which the time constant is sufficient to maintain the charge between two successive transient addressing operations.

The design concept of matrix control by means of row leads and column leads in order to obtain high screen complexity (large number of rows) entails the need to mount in series with the image element a non-linear resistor which is practically insulating at values below a threshold voltage but becomes increasingly conductive above said threshold voltage.

A non-linear element of this type can be of varistor material as described in French patent application No. 81 16217 filed on Aug. 25th 1981 in the name of the present Applicant and published under No. 2,512,240.

In the field of display screens, current technical requirements are primarily centered on the achievement of higher image definition. In the case of screens of the matrix display type, it is accordingly found necessary to design devices comprising a large number of addressing rows or columns which can amount to as many as 512 or even 1024. This entails a corresponding increase in the number of switching elements and therefore of varistors. For the purposes of large-scale production, it is necessary in particular to obtain good reproducibility and high stability of these components. Moreover, the electrical capacitance of the component must be matched with that of the associated cell, also with good reproducibility. In point of fact, however, these requirements cannot be fully satisfied by the materials commonly employed, such as agglomerates of zinc oxide powder containing particles of bismuth oxide and manganese oxide or similar material. The reproducibility and stability of varistors depend among other things on the grain size and on the techniques of passivation of the grain boundaries employed at the time of fabrication. The stray capacitance of the varistor which is also related to the grain boundaries cannot readily be controlled.

Other switching elements can be employed. As a general rule, however, liquid-crystal display screens usually exhibit defective uniformity of contrast according to the image elements considered. Such defects are due to dispersion of the characteristics of the switching elements, which may be substantial and is difficult to eliminate on large areas. Although to a lesser extent, such defects may also arise from the thickness of the liquid crystal layer and from its bonding layer.

In order to overcome these disadvantages, devices are known in which the non-linear elements are thin-film transistors which mainly have a base of amorphous silicon or polycrystalline silicon. However, a certain number of difficulties are encountered in this type of technology and therefore have to be overcome if high-quality addressing is to be achieved. The solutions to be found must accordingly take into account the following considerations:

(1) better control of characteristics which depend on the properties of two layers (silicon and insulator) and of their interface;

(2) a self-alignment technology is necessary in order to achieve better reproducibility over a large area.

Other solutions contemplate the use of non-linear elements consisting of dipole elements such as the structure having a base of two diodes mounted in series and in opposition.

These diodes are semiconductor diodes which all have the same operating point in the current-voltage characteristic. Devices of this type are described in French patent Application No. 83 14542 filed by the present Applicant on Sept. 13th 1983 and are designed in particular in the form of Schottky diodes.

However, the practical application of this solution usually entails the need for at least four masking levels.

The present invention relates to a non-linear control element and to a method of fabrication of said control element in which the number of masking operations can be reduced to two and in which the fabrication of masks does not call for a high standard of accuracy. Furthermore, the control elements obtained in accordance with the invention occupy only a very small surface area and are therefore less visible than elements of known types in the present state of the art.

SUMMARY OF THE INVENTION

The invention is therefore directed to a nonlinear control element for a flat display screen placed on a flat face of a substrate, said control element being distinguished by the fact that it comprises a plurality of layers stacked on said flat face of the substrate and consisting successively of a first layer of metallic material, a first layer of undoped amorphous semiconductor, a layer of doped amorphous semiconductor, a second layer of undoped amorphous semiconductor, a second layer of metallic material.

The invention also relates to a method of fabrication of a control element, said method being distinguished by the fact that it comprises the following successive steps:

(a) a first step involving deposition of a first layer of metallic material;

(b) a second step involving deposition of a first layer of undoped amorphous semiconductor material;

(c) a third step involving deposition of a layer of doped amorphous semiconductor material;

(d) a fourth step involving deposition of a second layer of undoped amorphous semiconductor material;

(e) a fifth step involving deposition of a second layer of metallic material;

(f) a sixth step which involves etching of a control column in the aforementioned layers deposited during previous steps;

(g) a seventh step involving passivation of the flanks of the column formed during the preceding step;

(h) an eighth step involving deposition of a layer of conductive material over both the substrate and the column;

(i) a ninth step which involves etching of at least one control electrode in the layer of conductive material, said control electrode being connected to the second layer of metallic material.

BRIEF DESCRIPTION OF THE DRAWINGS

Other features of the invention will be more apparent upon consideration of the following description and accompanying drawings, wherein.

DESCRIPTION OF THE PREFERRED EMBODIMENTS

Figure 1:
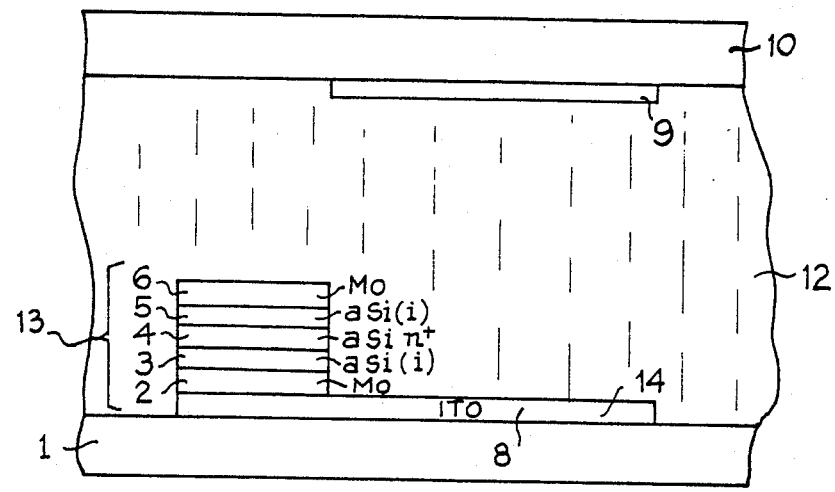
FIG. 1 illustrates one example of construction of a non-linear control element in accordance with the invention.

Reference being made to FIG. 1, there will first be described one example of construction of a non-linear control element in accordance with the invention.

A control element of this type comprises a layer 8 of conductive material deposited on a flat face of a substrate plate 1.

On this layer 8 is deposited an element having a mesa structure and constituted by five different layers in succession:

a first layer 2 of metallic material such as molybdenum (Mo);

a first layer 3 of undoped amorphous semiconductor material such as undoped amorphous silicon designated in FIG. 1 by the notation aSi(i);

a layer 4 of doped amorphous semiconductor material such as n+ doped silicon;

a second layer 5 of undoped amorphous semiconductor material of the same type as the material of the first layer 3;

a second layer 6 of metallic material such as molybdenum as in the case of the first layer 2.

This non-linear control element can be employed for controlling a liquid-crystal display cell. In this case, a second substrate plate 10 is associated with the substrate 1. Between the two substrate plates 1 and 10 is placed a liquid crystal 12. The layer 8 of conductive material constitutes a control electrode 14 and has a suitable shape. The substrate plate 10 also carries a control electrode 9 having the same shape and the same dimensions as the control electrode 14 and placed opposite to this latter.

Liquid-crystal cell control is performed by applying a voltage between the electrode 9 and the second metallic layer 6, the means employed for this purpose having been omitted from the drawings. The electric circuit therefore comprises: the electrode 9, the liquid-crystal layer 12, the electrode 14, the first metal layer 2, the layers 3, 4 and 5 of semiconductor material and the second metal layer 6. The layers 3 and 5 of undoped amorphous semiconductor material and the layer 4 of doped amorphous semiconductor material which are located between the two layers 2 and 6 of metallic material constitute two Schottky diodes mounted in series and in opposition. These two diodes permit the flow of current only above a threshold voltage. This threshold value determines the switching threshold of the liquid-crystal cell.

In accordance with a known practice in this technique, the two plates 1 and 10 are formed of transparent material such as glass, the electrodes 9 and 14 are also made of transparent material such as indium-tin oxide, and the cell thus operates in the optical transmission mode.

In another embodiment, the first metal layer 2 can cover the control electrode 14 and can be a reflecting layer. In this case the plate 1 does not need to be transparent and the cell operates in the optical reflection mode.

Referring to FIGS. 2 to 7, one example of a method of fabrication in accordance with the invention will now be described.

Figure 2:
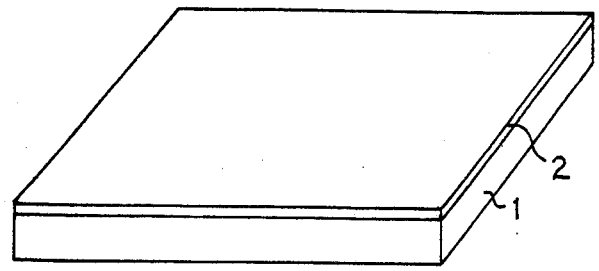
FIGS. 2 to 7 illustrate one example of a method for the fabrication of a non-linear control element in accordance with the invention.

A layer 2 of metal such as platinum, molybdenum or palladium is deposited on a substrate 1 such as a glass plate by vacuum evaporation or cathode sputtering. The thickness of this metal layer 2 must be a few hundred Angströms. The structure thus obtained is shown in FIG. 2.

A second step involves deposition of a first layer 3 of undoped amorphous silicon.

This operation is preferably performed by plasma-assisted deposition in accordance with the so-called glow discharge process at a temperature of approximately 250° C. Another possibility consists in depositing said first layer by vapor-phase epitaxy (also known as chemical vapor deposition, or CVD) at approximately 600° C. or alternatively by the method of low-pressure vapor-phase epitaxy (also known as low-pressure chemical vapor deposition, or LPCVD) at approximately 550° C. The thickness of the layer 2 thus formed must be within the range of 2000 to 6000 Angströms. In the case of deposition by epitaxy (CVD or LPCVD), it will prove advisable to carry out post-hydrogenation in order to passivate dangling bond defects or in other words to fill the broken bonds.

A third step consists in depositing a layer 4 of n+ doped amorphous silicon. The method of deposition employed can be one of the three methods mentioned in the foregoing.

The thickness of the layer 4 of n+ doped amorphous silicon must be within the range of 300 to 1000 Ångströms.

A fourth step consists in depositing a second layer 5 of undoped amorphous silicon. The method of deposition employed can also be one of the three methods mentioned above and the thickness of the layer obtained is equal to that of the first layer 3 of undoped amorphous silicon.

Figure 3:
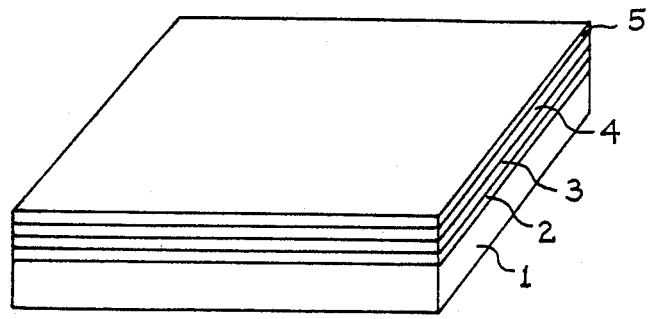

On completion of this fourth step, a structure as shown in FIG. 3 is thus obtained.

Figure 4:
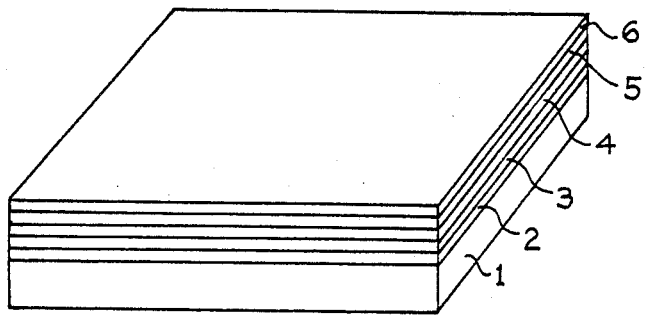

During a fifth step, a layer 6 of metal such as platinum, molybdenum or palladium is deposited by vacuum evaporation or cathode sputtering. This metal layer must have a thickness of a few hundred Ångströms. A structure as shown in FIG. 4 is thus obtained.

In a sixth step, a mesa structure is formed by photoetching in the five layers 2, 3, 4, 5 and 6 which were deposited earlier. To this end, the region corresponding to the mesa structure to be formed is shielded by means of a resin mask.

Figure 5:
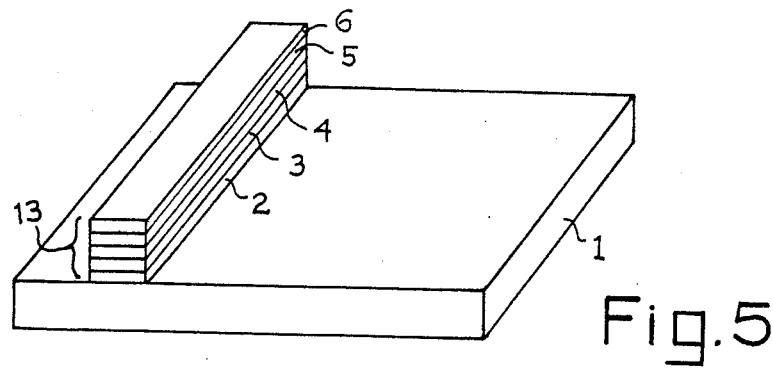
Figure 6:
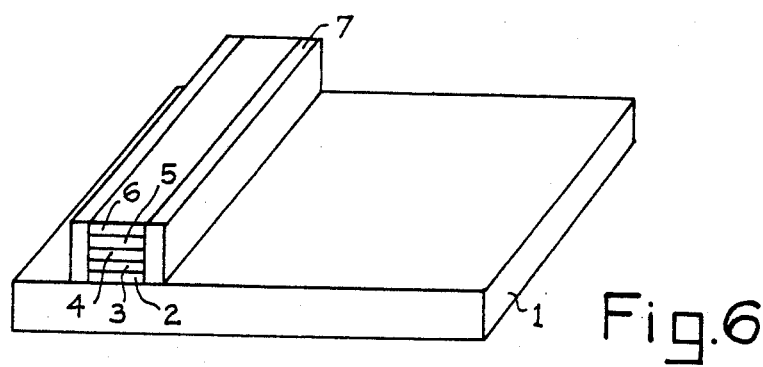

The layers 2 to 6 are then etched either by dry (plasma) process or by wet (chemical) process in the unmasked region, whereupon the protective resin is removed. A structure in the form of a column 13 is thus obtained as shown in FIG. 5.

A seventh step then consists in carrying out passivation of the flanks of the column 13. For this operation, different methods are open to choice. Passivation may be carried out by forming a deposit 7 of inorganic insulating material such as $SiO_2$ followed by an anisotropic etching process of the type known as reactive ion etching (RIE) which allows the insulating material to remain only on the flanks of the column 13.

In the event that the substrate 1 is transparent, passivation can also be effected by deposition of a photosensitive polyimide resin (of the negative type) followed by exposure through the substrate by means of a light source placed on the side opposite to the column 13 with respect to the substrate 1. The metal layers 2 and 6 form a light barrier for the resin located on the metal layer 6 on the top face of the column 13. These metal layers therefore perform the function of a photoetching mask. The unexposed resin is dissolved after development. The entire component of FIG. 5 is then covered with an insulating layer except for the top face of the column 13.

In order to obtain this result, it is also possible to deposit an insulating layer such as $SiO_2$ or $Si_3N_4$ prior to removal of the protective resin layer which was provided in the sixth step described earlier and which is now located on the top face of the column 13. Said insulating layer is deposited by the gas discharge process known as glow discharge, at a low temperature of the order of 150° C. This operation is followed by removal of the resin layer, thereby eliminating the insulating layer located on the top face of the column 13.

In an eighth step, annealing of the insulating layer is then performed for the purpose of solidifying this latter. The annealing temperature depends on the exact nature of the insulating material, which is known in the technique.

A ninth step consists in depositing a layer 8 of conductive material which can be transparent material when the control element is employed in a display screen which operates in the transmission mode. It will thus be possible to deposit a mixed oxide layer of tin and indium (ITO) or equivalent material ($In_2O_3$) A layer of this type will have a thickness within the range of 500 to 1000 Ångströms.

During a tenth step, a surface of the layer 8 of conductive material is shielded by means of a mask and an etching operation is carried out on said layer 8.

The masking operation just mentioned constitutes the second masking operation of the method in accordance with the invention and does not call for particularly strict accuracy of positioning.

Figure 7:
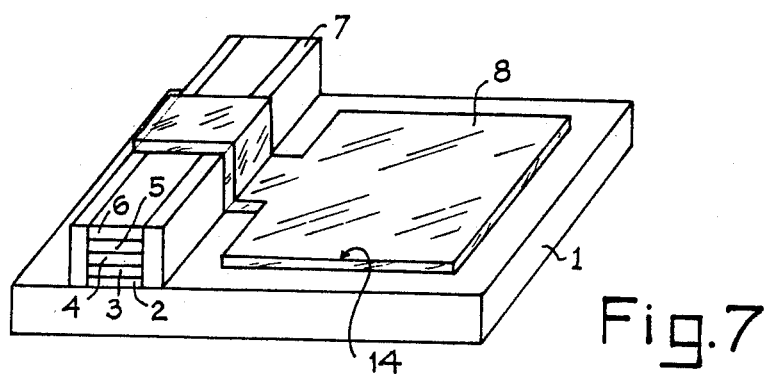

The shape of said mask is such that an electrode 14 as shown in FIG. 7 is formed at the surface of the substrate 1. It is apparent from this figure that the column 13 is coupled with the electrode 14 by means of an element such as the element constructed earlier and comprising successively a metal layer 2, a layer 3 of undoped amorphous silicon, a layer 4 of n+ doped amorphous silicon, a layer 5 of undoped amorphous silicon, and a metal layer 6. A control element as thus described constitutes two Schottky diodes mounted in series and in opposition.

By means of the method of fabrication in accordance with the invention as described in the foregoing, an array of electrodes 14, of columns 13 and of control elements for coupling each electrode with a column 13 can be formed collectively on a substrate plate.

It is worthy of note that the structure obtained and shown in FIG. 7 corresponds to the case in which the column flanks have been passivated in accordance with the first method described earlier during the seventh step. In the event that the column flanks have been passivated in accordance with one of the other two methods, an insulating layer covers the substrate 1 and the flanks of the column 13. In that case the electrode 14 is fabricated on said insulating layer.

Finally, during an eleventh step, the layer 8 of conductive material (ITO) is annealed at low temperature (200° C. to 300° C.).

Figure 8:
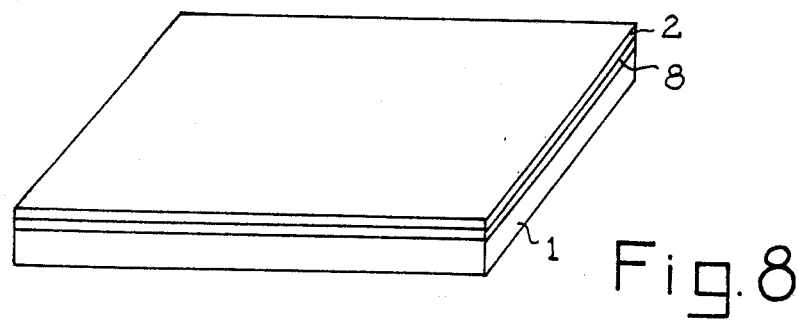
FIGS. 8 to 10 illustrate a variant of one example of a method for the fabrication of a non-linear control element in accordance with the invention.
Figure 9:
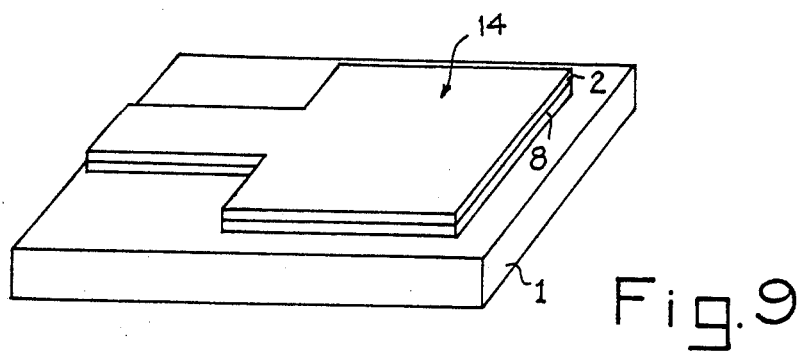
Figure 10:
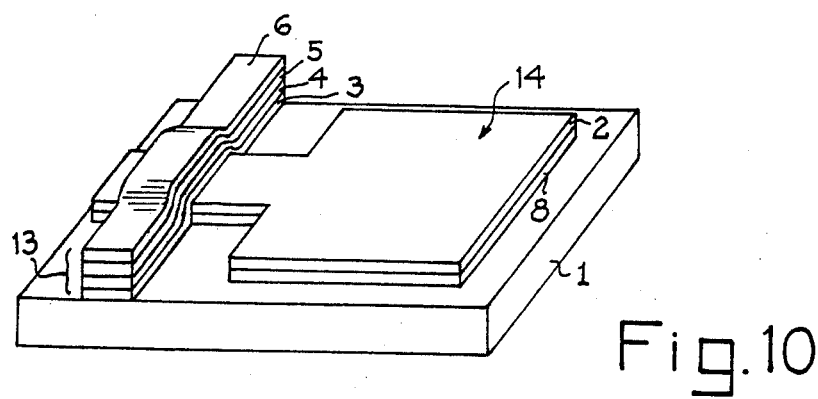

Referring to FIGS. 8 to 10, an alternative embodiment of the method of the invention will now be described.

In accordance with this method, a layer 8 of conductive material such as ITO and then a layer 2 of metallic material are deposited on a substrate plate 1 (as shown in FIG. 8).

These two layers are then etched so as to form at least one electrode 14 (as shown in FIG. 9).

On the assembly thus obtained, there are successively deposited a layer 3 of undoped amorphous silicon, a layer 4 of n+ doped amorphous silicon, a layer 5 of undoped amorphous silicon, and a layer 6 of metallic material. These four deposited layers are then etched so as to constitute a column 13 which forms a bridge over part of the electrode 14. The resulting structure as shown in FIG. 10 is similar to the arrangement of FIG. 1 in which the control element is constituted by Schottky diodes in series and in opposition, except for the fact that the electrode 14 comprises a layer 2 of metallic material. Nevertheless, the same process makes it possible to obtain the same structure as that shown in FIG. 1 by etching the layer 8 so as to form the electrode 14 prior to deposition of the metallic material 2. The final structure will then have the distinctive ability to operate in the transmission mode on condition that the substrate 1 is transparent.

The alternative method in accordance with the invention as considered in the foregoing makes use of the same techniques of deposition, of etching and of annealing as in the first method described earlier. This variant calls for only two masking operations, namely the operation required for etching the electrode 14 and the operation required for etching the column 13. The thicknesses of the layers are the same as those contemplated earlier.

Reference being made to FIGS. 11 to 14, there will now be described another alternative method of fabrication in accordance with the invention.

In this method, during five first successive steps, the following five layers are deposited respectively on a substrate 1:
- a layer 8 of conductive material (ITO);
- a layer 2 of metallic material;
- a layer 3 of undoped amorphous silicon;
- a layer 4 of n+ doped amorphous silicon;
- a layer 5 of undoped amorphous silicon.

Figure 11:
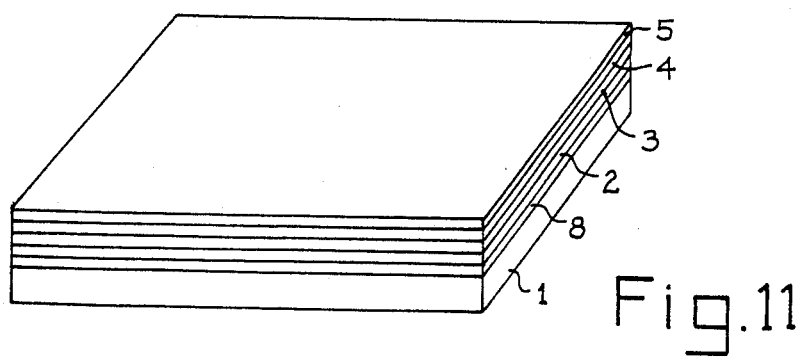
FIGS. 11 to 14 illustrate another variant of the method of fabrication in accordance with the invention.

The component thus obtained is illustrated in FIG. 11.

Figure 12:
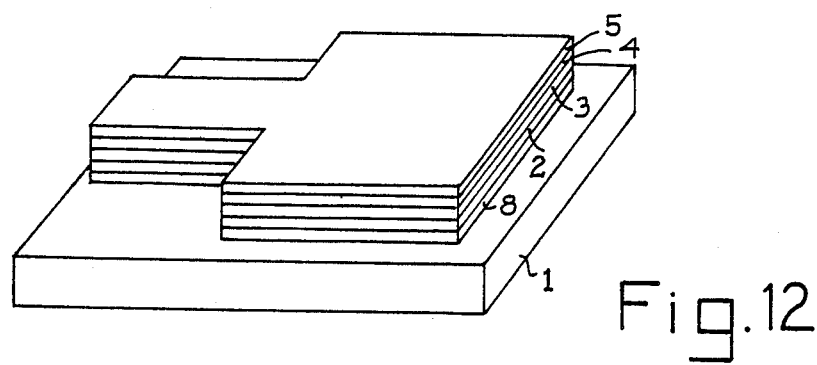

During a sixth step, the shape of an electrode is etched in the five layers which have been deposited, the structure thus obtained being shown in FIG. 12.

Figure 13:
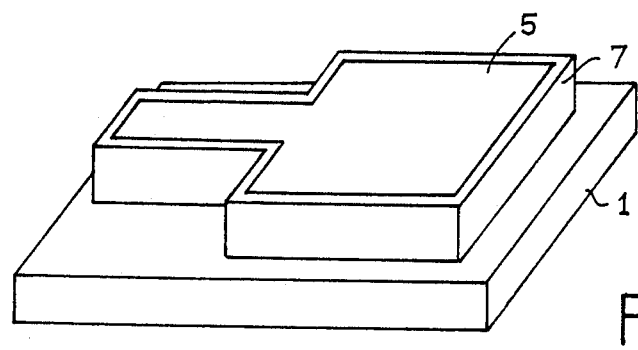

A seventh step consists in passivating the flanks of the electrode by means of a film 7, thus producing a structure as illustrated in FIG. 13.

Figure 14:
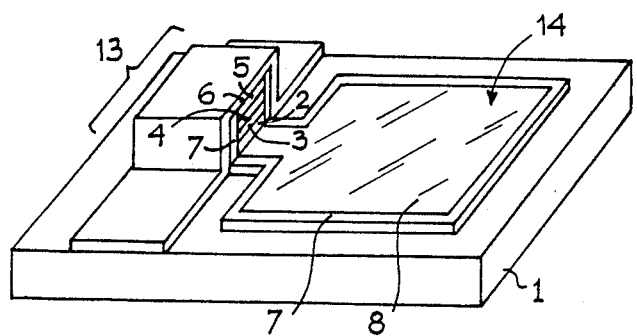

An eighth step consists in depositing a layer 6 of metallic material. Said layer 6 and the four layers 2, 3, 4 and 5 are then etched without attacking the layer 8 of conductive material so as to form a column 13 astride the electrode 14. There is thus obtained a structure as shown in FIG. 14 in which the film 7 insulates the layer 6 of metallic material of the other layers which have been deposited. The structure is similar to that shown in FIG. 1.

The different steps of this method are performed in accordance with the same techniques as those described earlier. Again in the case of this alternative method of construction, only two masking operations are employed respectively for obtaining the electrode 14 and for obtaining the column 13.

Figure 15:
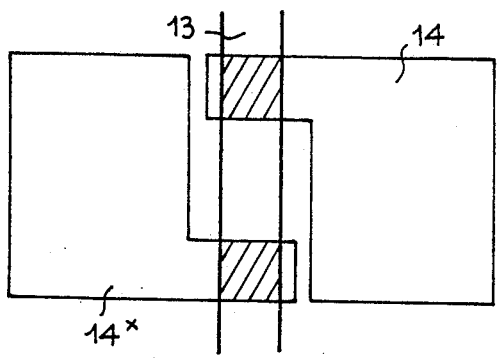
FIGS. 15 and 16 are examples showing different forms of control electrodes coupled to column leads by means of non-linear control elements in accordance with the invention.

The alternative embodiments of the method in accordance with the invention as described in the foregoing permit collective formation of the electrodes 14 and the columns 13 on a large surface area. As illustrated in FIG. 15, these methods make it possible to duplicate an electrode 14 by means of an electrode 14$^x$ which is coupled with the same column 13.

Figure 16:
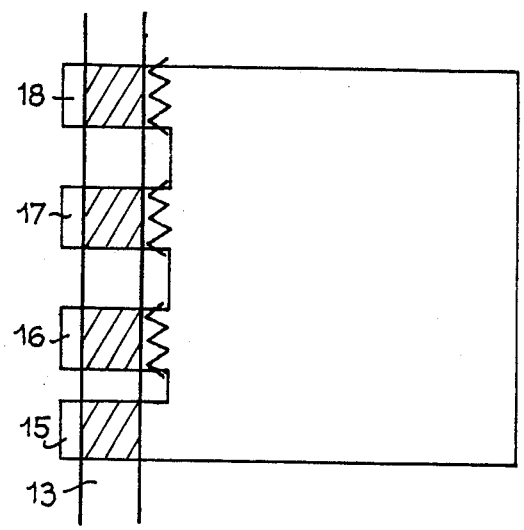

As shown in FIG. 16, these alternative embodiments make it possible to couple an electrode 14 with a column 13 by means of a plurality of non-linear control elements such as the four elements 15, 16, 17, 18. It will be possible to remove defective or unused control elements such as those designated by the references 16, 17 and 18. This removal can be performed by laser-cutting in zones indicated by the jagged lines in FIG. 16 at the base of the junction between control elements and electrode 14.

The alternative embodiments described in the foregoing also permit fabrication of control elements which comprise in each case two pin diodes mounted in series and in opposition. In this case, instead of having three layers of silicon (one layer of doped silicon sandwiched between two layers of undoped silicon), provision is made for five silicon layers:
- a n+ doped amorphous silicon layer;
- an undoped amorphous silicon layer;
- an n+ doped amorphous silicon layer;
- an undoped amorphous silicon layer;
- a p+ doped amorphous silicon layer.

In its alternative embodiments, the method in accordance with the invention accordingly takes place in the same manner except for the fact that five steps are involved in deposition of silicon instead of three.

The alternative embodiments of the method in accordance with the invention are also applicable to the fabrication of non-linear control elements in which the diodes are of the Metal-Insulator-Semiconductor (MIS) type without thereby departing from the scope of the invention.

What is claimed is:

1. A method of fabrication of a non-linear control element for a flat display screen placed on a flat face of a substrate, comprising a plurality of layers stacked on said flat face of the substrate and consisting successively of a first layer of metallic material, a first layer of undoped amorphous semiconductor material, a layer of doped amorphous semiconductor material, a second layer of undoped amorphous semiconductor material, a second layer of metallic material, comprising the following successive steps:
   (a) a first step involving deposition of a first layer of metallic material;
   (b) a second step involving deposition of a first layer of undoped amorphous semiconductor material;
   (c) a third step involving deposition of a layer of doped amrophous semiconductor material;
   (d) a fourth step involving deposition of a second layer of undoped amorphous semiconductor material;
   (e) a fifth step involving deposition of a second layer of metallic material;
   (f) a sixth step which involves etching of a control column in the aforementioned layers deposited during previous steps;
   (g) a seventh step involving passivation of the flanks of the column formed during the preceding step;
   (h) an eighth step involving deposition of a layer of conductive material over both the substrate and the column;
   (i) a ninth step which involves etching of at least one control electrode in the layer of conductive material, said control electrode being connected to the second layer of metallic material.

2. A method of fabrication of a non-linear control element for a flat display screen placed on a flat face of a substrate on said flat face of the substrate and consisting successively of a first layer of metallic material, a first layer of undoped amorphous semiconductor material, a layer of doped amorphous semiconductor material, a second layer of undoped amorphous semiconductor material, a second layer of metallic material, comprising the following steps:
   (a) a first step involving deposition of a layer of conductive material;
   (b) a second step involving deposition of a first layer of metallic material;
   (c) a third step which involves forming of at least one ocntrol electrode by ethcing said layer of conductive material and said first layer of metallic material;
   (d) a fourth step involving deposition of a first layer of undoped amorphous semiconductor material;
   (e) a fifth step involving deposition of a layer of doped amorphous semiconductor material;

(f) a sixth step involving deposition of a second layer of undoped amorphous semiconductor material;

(g) a seventh step involving deposition of a second layer of metallic material;

(h) an eighth step which involves etching of a control column in the aforementioned layers deposited during previous steps but without attacking the control electrode and in such a manner as to ensure that a portion of said column is in contact with said control electrode.

3. A method according to claim 2, wherein the third etching step is carried out prior to the second step involving deposition of a first layer of metallic material.

4. A method of fabrication of a nonlinear control element for a flat display screen placed on a flat face of a substrate, comprising a plurality of layers stacked on said flat face of the substrate and consisting successively of a first layer of metallic material, a first layer of undoped amorphous semiconductor material, a layer of doped amorphous semiconductor material, a second layer of undoped amorphous semiconductor material, a second layer of metallic material, comprising the following successive steps carried out on the substrate:

(a) a first step involving deposition of a layer of conductive material;

(b) a second step involving deposition of a first layer of metallic material;

(c) a third step involving deposition of a first layer of undoped amorphous semiconductor material;

(d) a fourth step involving deposition of a layer of doped amorphous semiconductor material;

(e) a fifth step involving deposition of a second layer of undoped amorphous semiconductor material;

(f) a sixth step which involves etching of at least one control electrode in the previously deposited layers;

(g) a seventh step involving deposition of a layer of metallic material;

(h) an eighth step involving deposition of a layer of metallic material;

(i) a ninth step which involves etching of a control column in the layer of metallic material and the control electrode without attacking the layer of conductive material.

5. A method of fabrication of a control element according to claim 4, wherein the ninth step which involves etching of a control column does not attack the first layer of metallic material.

6. A method of fabrication according to claim 1, wherein the step which involves etching of a control column is such that one column is coupled with a plurality of control electrodes.

7. A method of fabrication according to claim 1, wherein the step which involves etching of a control column is such that one control column is coupled with each control electrode at a number of different points.

* * * * *